US012188515B2

(12) United States Patent
Kim et al.

(10) Patent No.: US 12,188,515 B2
(45) Date of Patent: Jan. 7, 2025

(54) BALL JOINT, SUSPENSION ARM COMPRISING SAME, AND MANUFACTURING METHOD THEREOF

(71) Applicant: ILJIN CO., LTD., Gyeongju-si Gyeongsangbuk-do (KR)

(72) Inventors: Hyun Woo Kim, Gyeongju-si Gyeongsangbuk-do (KR); Sung Kook Park, Gyeongju-si Gyeongsangbuk-do (KR); Hyo Sang Hwang, Gyeongju-si Gyeongsangbuk-do (KR); Min Kook Park, Gyeongju-si Gyeongsangbuk-do (KR); Soon Chan Kwon, Gyeongju-si Gyeongsangbuk-do (KR); Seung Hyun Nam, Gyeongju-si Gyeongsangbuk-do (KR); Se Hwan Kim, Gyeongju-si Gyeongsangbuk-do (KR); Mu Chang Kang, Gyeongju-si Gyeongsangbuk-do (KR)

(73) Assignee: ILJIN CO., LTD., Gyeongju-si (KR)

( * ) Notice: Subject to any disclaimer, the term of this patent is extended or adjusted under 35 U.S.C. 154(b) by 667 days.

(21) Appl. No.: 17/133,701

(22) Filed: Dec. 24, 2020

(65) Prior Publication Data
US 2021/0114427 A1 Apr. 22, 2021

Related U.S. Application Data

(63) Continuation of application No. PCT/KR2019/007751, filed on Jun. 26, 2019.

(30) Foreign Application Priority Data

Jun. 26, 2018 (KR) ........................ 10-2018-0073536

(51) Int. Cl.
*F16C 11/06* (2006.01)
*B60G 7/00* (2006.01)

(52) U.S. Cl.
CPC .......... *F16C 11/0633* (2013.01); *B60G 7/005* (2013.01); *F16C 11/0685* (2013.01); *F16C 11/0695* (2013.01); *B60G 2204/416* (2013.01)

(58) Field of Classification Search
CPC .............. F16C 11/0619; F16C 11/0623; F16C 11/0628; F16C 11/0633; F16C 11/0685;
(Continued)

(56) References Cited

U.S. PATENT DOCUMENTS 3,944,376 A * 3/1976 Hata .................... F16C 11/0685
403/138
4,235,558 A * 11/1980 Snyder ................ F16C 11/0604
403/133
(Continued)

FOREIGN PATENT DOCUMENTS

DE 630181 A 5/1936
DE 630181 C * 5/1936 .......... F16C 11/0619
(Continued)

OTHER PUBLICATIONS

"Stich Welding vs. Seam Welding." Vista Industrial, Oct. 20, 2017, [online], [retreived on Jul. 27, 2023] Retrieved from the Internet < URL: https://www.vista-industrial.com/blog/stitch-welding-vs-seam-welding/>. (Year 2017).*
(Continued)

*Primary Examiner* — Josh Skroupa
*Assistant Examiner* — Kevin J Baynes
(74) *Attorney, Agent, or Firm* — Dinsmore & Shohl LLP; Yongsok Choi, Esq.

(57) ABSTRACT

A suspension arm includes a ball stud including a spherical ball; a bearing in which the spherical ball is accommodated; a housing having an inner peripheral portion and an outer peripheral portion; an arm body coupled to the outer peripheral portion of the housing; and an insert molding part which
(Continued)

is injected to a lower portion of the bearing and the outer peripheral portion of the housing to be coupled to the bearing, the housing, and the arm body. The housing includes a matching portion having a matching surface formed to protrude in a radially outward direction from an upper portion of the outer peripheral portion and to be brought into contact with a mold. By forming the matching portion, it is possible to reduce the volume of the housing and to reduce the weight of the suspension arm while providing the matching surface with the mold.

13 Claims, 11 Drawing Sheets

(58) Field of Classification Search
CPC ............... F16C 11/0695; B60G 7/005; B60G 2204/416; B60G 2206/8201
See application file for complete search history.

(56) References Cited

U.S. PATENT DOCUMENTS

| | | | | |
|---|---|---|---|---|
| 4,993,863 A * | 2/1991 | Inoue | ............... | F16C 11/0657 403/71 |
| 5,009,538 A * | 4/1991 | Shirai | ............... | F16C 11/0657 403/140 |
| 5,368,408 A * | 11/1994 | Shimizu | ............ | F16C 11/0638 403/136 |
| 5,427,467 A * | 6/1995 | Sugiura | ............ | F16C 11/0685 403/140 |
| 5,609,433 A * | 3/1997 | Pazdirek | ............ | F16C 11/069 403/135 |
| 5,616,967 A * | 4/1997 | Lee | ............... | H05K 1/0262 29/829 |
| 6,287,040 B1 * | 9/2001 | Fischer | ............... | F16J 3/042 277/635 |
| 6,398,446 B1 * | 6/2002 | Pazdirek | ............ | B60G 7/001 403/135 |
| 6,488,436 B1 * | 12/2002 | Modat | ............... | F16C 11/0633 403/135 |
| 6,698,963 B1 * | 3/2004 | Parker | ............... | B62D 7/20 403/130 |
| 7,757,534 B2 | 7/2010 | Shiga et al. | | |
| 7,938,417 B2 | 5/2011 | Ersoy et al. | | |
| 8,152,186 B2 * | 4/2012 | Jeong | ............... | B60G 7/005 280/124.134 |
| 8,196,940 B2 * | 6/2012 | Jeong | ............ | B29C 45/14778 280/124.134 |
| 8,414,003 B2 * | 4/2013 | Yu | ............ | B60G 7/001 280/124.134 |
| 8,657,314 B2 * | 2/2014 | Mosteiro Goyoaga | ............... | B60G 7/005 280/124.152 |
| 9,227,480 B2 * | 1/2016 | Jekel | ............... | B60G 21/00 |
| 10,336,154 B2 * | 7/2019 | Meabe Zabala | ........ | B60G 7/005 |
| 10,570,951 B2 * | 2/2020 | Eulerich | ............ | F16C 11/0623 |
| 11,078,952 B2 * | 8/2021 | Sieve | ............... | F16C 11/0623 |
| 11,414,144 B2 * | 8/2022 | Ahlbrand | ............ | B60G 7/005 |
| 2011/0133423 A1 * | 6/2011 | Jeong | ............ | F16C 11/0671 280/124.1 |
| 2012/0141192 A1 * | 6/2012 | Kwon | ............ | F16C 11/0604 164/90 |
| 2013/0216298 A1 * | 8/2013 | Jekel | ............ | B60G 7/005 403/66 |
| 2017/0129040 A1 * | 5/2017 | Eulerich | ............ | F16C 11/0695 |
| 2021/0102573 A1 * | 4/2021 | Nachbar | ............... | B62D 7/20 |

FOREIGN PATENT DOCUMENTS

| | | | | |
|---|---|---|---|---|
| DE | 102006052628 A1 * | 6/2008 | ......... | F16C 11/0623 |
| DE | 102013108080 A1 * | 2/2014 | ............ | B60G 7/005 |
| JP | 2015151097 A | 8/2015 | | |
| KR | 1020100109708 A | 10/2010 | | |
| KR | 20100010746 U * | 11/2010 | ......... | B60G 21/0551 |
| KR | 20110015816 A * | 2/2011 | ............ | B60G 7/005 |
| KR | 101538586 B1 | 7/2015 | | |
| KR | 1020170080448 A | 7/2017 | | |

OTHER PUBLICATIONS

International Search Report of PCT/KR2019/007751 dated Oct. 10, 2019.

* cited by examiner

BALL JOINT, SUSPENSION ARM COMPRISING SAME, AND MANUFACTURING METHOD THEREOF

CROSS REFERENCE TO RELATED APPLICATIONS

This application is a continuation of International Application No. PCT/KR2019/007751 filed on Jun. 26, 2019, which claims priority to Korean Patent Application No. 10-2018-0073536 filed on Jun. 26, 2018, the entire contents of which are herein incorporated by reference.

TECHNICAL FIELD

The present disclosure relates to a ball joint, a suspension arm comprising the same and a manufacturing method thereof.

BACKGROUND ART

A vehicular suspension device is a device for connecting a vehicle body and a wheel. The vehicular suspension device comprises a spring for absorbing vibration or impact transferred from a road surface to the vehicle body, a shock absorber for adjusting the operation of the spring, and a suspension arm or a suspension link for controlling the operation of the wheel.

The suspension device is classified into a swing arm type, a wishbone type, and a MacPherson strut type according to a manner of controlling the operation of the wheel. The wishbone type of suspension device has a suspension arm for connecting a knuckle coupled to the wheel and the vehicle body. That is, one end of the suspension arm is connected to a cross member or a sub-frame which constitutes the vehicle body, and the other end of the suspension arm is connected to the knuckle through a ball joint. The suspension arm supports the wheel on the vehicle body and appropriately controls a toe-in of the wheel according to a driving condition of the vehicle, thereby improving straight drivability and steering stability of the vehicle.

SUMMARY

Technical Problem

The present disclosure provides a suspension arm which is advantageous in reducing weight of a housing while providing a matching surface which is matched with a mold.

In addition, the present invention provides a method of manufacturing the suspension arm.

Technical Solution

Embodiments according to one aspect of the present disclosure relate to a vehicular suspension arm.

The suspension arm according to one embodiment of the present disclosure may comprise: a ball stud including a spherical ball; a bearing in which the spherical ball is accommodated; a housing having an inner peripheral portion and an outer peripheral portion, the bearing being accommodated in the inner peripheral portion; an arm body coupled to the outer peripheral portion of the housing; and an insert molding part which is injected to a lower portion of the bearing and the outer peripheral portion of the housing to be coupled to the bearing, the housing, and the arm body, wherein the housing may comprise a matching portion having a matching surface formed to protrude in a radially outward direction from an upper portion of the outer peripheral portion and to be brought into contact with a mold.

In one embodiment, the matching portion may comprise an inclined surface formed to be inclined in the radially outward direction from a lower portion of the housing toward the upper portion of the housing.

In one embodiment, an angle between the inclined surface and a central axis of the housing may be in a range of 20 degrees to 65 degrees.

In one embodiment, the matching portion may comprise a curved surface formed to be curved in the radially outward direction from a lower portion of the housing toward the upper portion of the housing.

In one embodiment, the matching portion may comprise a lower surface parallel to the matching surface.

In one embodiment, a linear distance in a radial direction between a radially leading end surface of an upper end portion of the housing and a radially leading end surface of the matching portion may be in a range of 1.5 mm to 4 mm.

In one embodiment, an outer peripheral surface of the housing may comprise at least one welding surface in which the arm body and the outer peripheral surface of the housing are welded.

In one embodiment, the at least one welding surface may have a plurality of welding surfaces distributed at regular intervals along the outer peripheral surface of the housing.

In one embodiment, the matching portion and the arm body may be arranged to be spaced apart from each other in an axial direction, and an axial force may be not applied between the matching portion and the arm body by the coupling of the housing and the arm body by the welding.

In one embodiment, the welding between the housing and the arm body may be an arc welding which supplies heat necessary for the welding through an electric arc generated between a welding rod and a welding target portion.

In one embodiment, a radial thickness of the housing below the matching portion may be in a range of 2 mm to 4 mm.

In one embodiment, an inner peripheral surface of a lower end portion of the housing may have a groove formed to be concave in the radially outward direction along a circumferential direction of the inner peripheral surface.

A method of manufacturing a suspension arm according to one embodiment of the present disclosure may comprise: a step of coupling an arm body to an outer peripheral portion of a housing by a welding; a step of accommodating a spherical ball of a ball stud in a bearing; a step of disposing a coupled body of the housing and the arm body in a mold; a step of accommodating the bearing in which the ball stud is accommodated in the housing; and a step of injecting a plastic molding material to a lower portion of the bearing and an outer peripheral portion of the housing to be coupled to the bearing, the housing, and the arm body. The housing may comprise a matching portion formed to protrude in a radially outward direction from an outer peripheral surface of an upper portion of the housing. A matching surface may be formed on an upper surface of the matching portion. In the step of disposing the coupled body of the housing and the arm body in the mold, a portion of the mold may be in contact with the matching surface of the matching portion.

In one embodiment, the matching portion may comprise an inclined surface formed to be inclined in the radially outward direction from a lower portion of the housing toward an upper portion of the housing.

In one embodiment, in the step of coupling the arm body to the outer peripheral portion of the housing by the welding, the welding may be an arc welding which supplies heat necessary for the welding through an electric arc generated between a welding rod and a welding target portion.

In one embodiment, the step of coupling the arm body to the outer peripheral portion of the housing by the welding may be performed on at least one welding surface formed in a length of 10 mm to 15 mm along a circumferential direction on the outer peripheral surface of the housing.

In one embodiment, the plastic molding material may be filled only in a region below the upper surface of the matching portion with reference to an axial direction.

In one embodiment, the method of manufacturing the suspension arm may further comprise forming the arm body by a burring process. The burring process may comprise drilling a hole in a flat steel plate; widening the hole to deform an edge of the hole in a cylindrical shape by press-punching to widen the hole; and forming a first extended portion that is to be coupled to a welding surface formed on an outer peripheral portion of the housing.

A ball joint according to one embodiment of the present disclosure may comprise a housing having an inner peripheral portion and an outer peripheral portion, a bearing being accommodated in the inner peripheral portion. The housing may comprise a matching portion having a matching surface formed to protrude in a radially outward direction from an upper portion of the outer peripheral portion and to be brought into contact with a mold.

Advantageous Effects

According to various embodiments of the present disclosure, it is possible to reduce the weight of a suspension arm by reducing the weight of a housing of a ball joint while providing a matching surface which is matched with a mold, which is required in a manufacturing process of the suspension arm.

In addition, it is possible to provide a matching surface in which a housing of a ball joint and a mold are in contact with each other in a state in which the housing of the ball joint is not supported by an arm body coupled to the ball joint in an axial direction.

DESCRIPTION OF REFERENCE NUMERALS

1: suspension arm
10: suspension arm body
20: molding part
30: ball joint
31: ball stud
32: bearing
33: arm body
36: insert molding part
40: bush
100, 200, 300: housing
110, 210, 310: matching portion
111, 211, 311: matching surface

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, the terms "comprising", "including", "having" and the like used herein should be construed as open-ended terms encompassing the possibility of including other embodiments.

The singular form described herein may include the plural form unless the context clearly dictates otherwise, and this is equally applied to the singular form set forth in the claims.

Throughout the present disclosure, when a component is referred to as being "connected" or "coupled" to another component, the component may be directly connected or coupled to another component, or may be connected or coupled to another component by intervening yet another component therebetween.

Dimensions and numerical values described in the present disclosure are not limited only to the dimensions and numerical values described herein. Unless otherwise specified, these dimensions and numerical values may be understood to mean the values described herein and the equivalent ranges including the described values. For example, a dimension of "2 mm" described herein may be understood to include "about 2 mm."

Directional directives of "upward", "above" and the like used herein are described on the basis of a direction in which a rod of a ball stud is positioned relative to a ball in the accompanying drawings, directional directives of "downward", "below" and the like mean the direction opposite the above "upward", "above" and the like. The rod and the ball shown in the accompanying drawings may be arranged in directions different from the above directions, and the directional directives may be understood based thereon.

Figure 1:
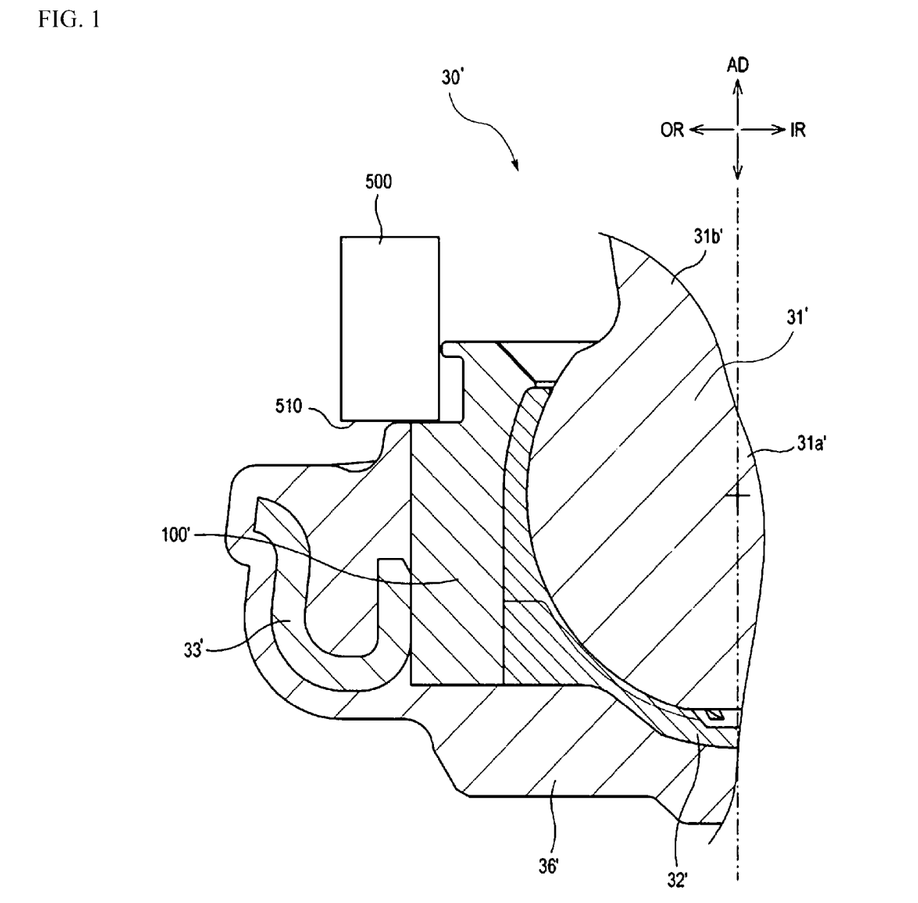
FIG. 1 is a partial cross-sectional view showing a conventional ball joint.

FIG. 1 is a partial cross-sectional view showing a conventional ball joint.

Referring to FIG. 1, a conventional ball joint 30' comprises a ball stud 31' having a ball 31a' and a rod 31b'; a bearing 32' in which the ball 31a' is accommodated; and a housing 100' in which the ball 31a' and the bearing 32' are accommodated. An insert molding part 36' is formed to couple the bearing 32' with the housing 100'. The insert molding part 36' also serves to couple the ball joint 30' with the arm body 33' in a state in which the ball joint 30' is mounted on the arm body 33'.

In such a conventional configuration, there is a problem that it is difficult to provide a matching surface between the housing 100' and a mold 500 during the manufacturing process of the suspension arm. In order to form the matching surface, a radial thickness of the housing 100' should be increased, which makes it difficult to reduce the weight of the housing 100'.

Figure 2:
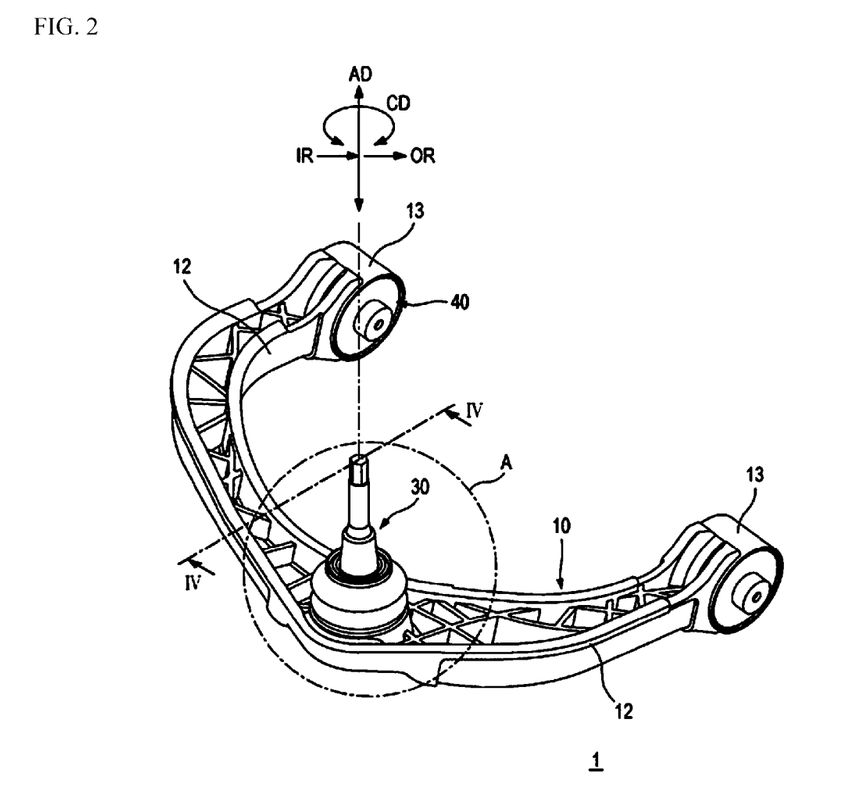
FIG. 2 is a perspective view of a vehicular suspension arm according to one embodiment of the present disclosure.
Figure 3:
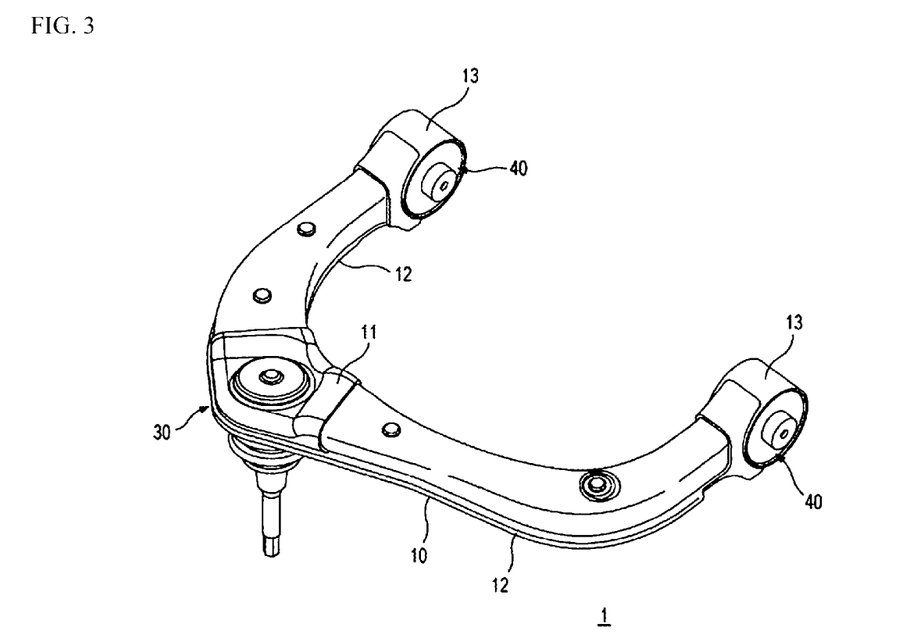
FIG. 3 is a perspective view of the vehicular suspension arm according to one embodiment of the present disclosure when viewed in another direction.

Hereinafter, embodiments of the present disclosure will be described with reference to the accompanying drawings. In the accompanying drawings, the same reference numerals are assigned to the same or corresponding components. Further, in the following descriptions of the embodiments, duplicate descriptions of the same or corresponding components may be omitted. However, even though a description of a component is omitted, such a component is not intended to be excluded in any embodiment. FIG. 2 is a perspective view of a vehicular suspension arm 1 according to one embodiment of the present disclosure, and FIG. 3 is a perspective view of the vehicular suspension arm 1 according to one embodiment of the present disclosure when viewed in another direction.

The suspension arm 1 according to one embodiment of the present disclosure may be used as an upper control arm. Also, although not shown in the drawings of the present disclosure, the suspension arm 1 according to the present disclosure may be used as a lower control arm similarly to the upper control arm.

The suspension arm 1 according to one embodiment may be formed as a composite suspension arm, which is formed of two or more types of materials. The composite suspension arm may be defined as a hybrid suspension arm which has a reduced weight compared to a suspension arm made of a metal material and stiffness equal to or similar to that of the suspension arm made of a metal material. For example, the suspension arm 1 means a suspension arm in which a molding part 20 made of a plastic material is formed on a suspension arm body 10 made of a steel material in order to reduce the weight of the vehicle. In addition, in the suspension arm 1, a reinforcing part (not shown) made of a steel material may be further provided in the suspension arm body 10 in order to improve the mechanical strength of the suspension arm 1. Accordingly, the strength of the suspension arm 1 may be enhanced and the coupling of the suspension arm body 10 and a molding part 20 may be enhanced.

The vehicular suspension arm 1 may include the suspension arm body 10, the molding part 20, a ball joint 30, and bushes 40.

The suspension arm body 10 may be manufactured by applying a general press process to a vehicular high-tension steel plate. The suspension arm body 10 may be formed of a metal material. A surface of the suspension arm body 10 may be coated for corrosion protection. The suspension arm body 10 may form the skeleton of the suspension arm 1 and may be manufactured by press-forming a metallic plate (for example, a high-tension steel plate). When the suspension arm 1 is used as the upper control arm, the suspension arm body 10 may have a Y-like planar shape, but not necessarily limited thereto.

The suspension arm body 10 may comprise two leg parts 12 and a joint part 11 integrally connecting the two leg parts 12. A bush pipe 13 may be coupled to a leading end portion of each of the two leg parts 12. A ball joint pipe 14 may be coupled to a leading end portion of the joint part 11. The bush 40 may be inserted into each of the two bush pipes 13.

In one embodiment, the bush pipes 13 and the ball joint pipe may be respectively coupled to the leading end portions of the leg parts 12 and the leading end portion of the joint part 11 by welding. For example, the welding process may be performed by an electric welding, a $CO_2$ welding, an oxygen welding, an argon welding, a spot welding or the like, but not limited thereto. In another embodiment, the bush pipes 13 and the ball joint pipe 14 may be respectively coupled to the leading end portions of the leg parts 12 and the leading end portion of the joint part 11 in a manner other than the above-described welding, for example, a laser welding, an ultra sonic or the like, but not limited to these methods.

Figure 4:
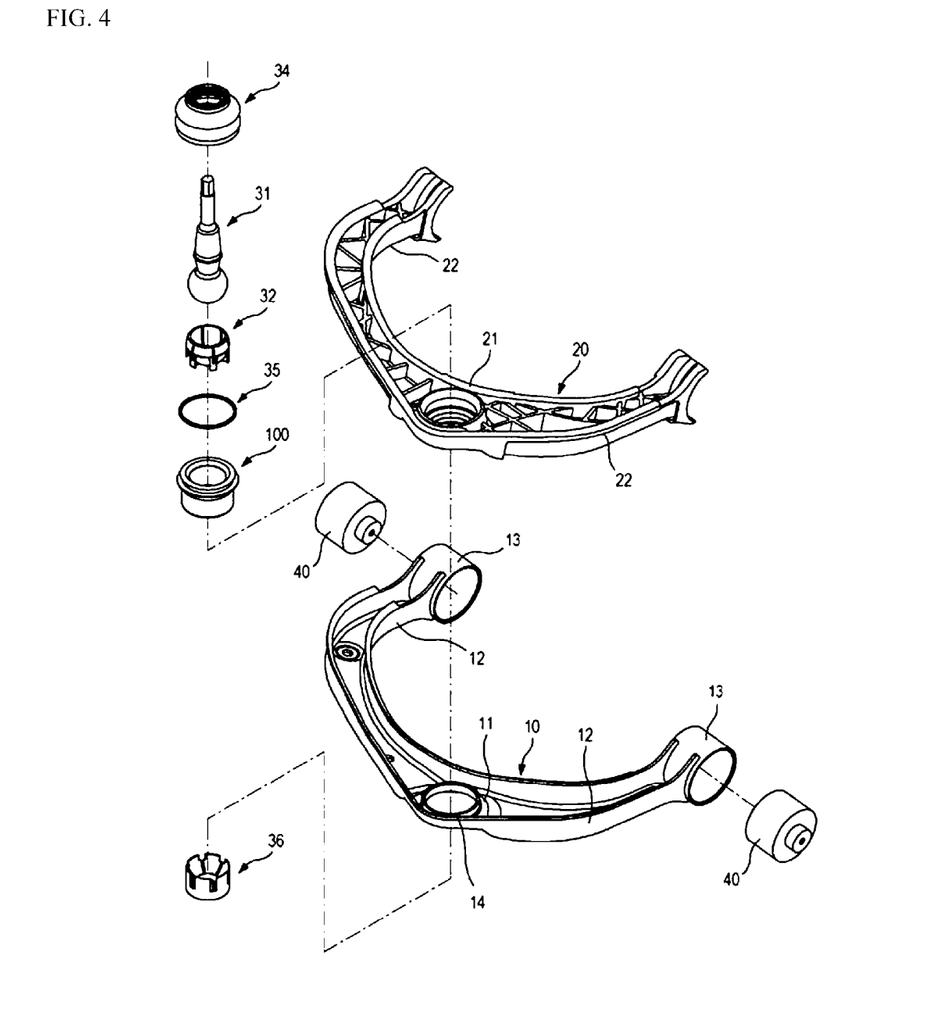
FIG. 4 is an assembly view showing a process of assembling the vehicular suspension arm according to one embodiment of the present disclosure.

FIG. 4 is an assembly view showing an assembling structure of the suspension arm 1 according to one embodiment of the present disclosure.

Referring to FIG. 4, the molding part 20 is coupled to one surface of the suspension arm body 10. The bush 40 is inserted into the bush pipe 13 located at the leading end portion of each of the leg parts 12. The ball joint 30 is inserted into the ball joint pipe 14 located at the leading end portion of the joint part 11 of the suspension arm body 10.

In one embodiment, the molding part 20 is formed of a fiber-reinforced plastic material. Specifically, the molding part 20 may be formed of a polyamide resin such as nylon 6 (PA6), nylon 66 (PA66), or the like, or may be formed of a polyamide resin in which a glass fiber is included in nylon 6, nylon 66, or the like. The molding part 20 may be generally similar in shape to the suspension arm body 10. That is, the molding part 20 may comprise two leg parts 22 and a joint part 21. The molding part 20 may be insert-injected into the mold 500 to be coupled to the suspension arm body 10.

In one embodiment, the molding part 20 may comprise reinforcing rib having a generally lattice pattern shape and formed to protrude integrally from the molding part 20. The shape of the reinforcing rib may be designed using a computer-aided optimum design program to minimize the weight of the molding part 20.

A housing 100 is inserted into the ball joint pipe 14. A coupled body of a bearing 32 and a ball stud 31 are inserted into the housing 100. A dust cover 34 is covered on the upper side of the housing 100. In the lower side of the housing 100, a molding material is injected to form an insert molding part 36.

Figure 5:
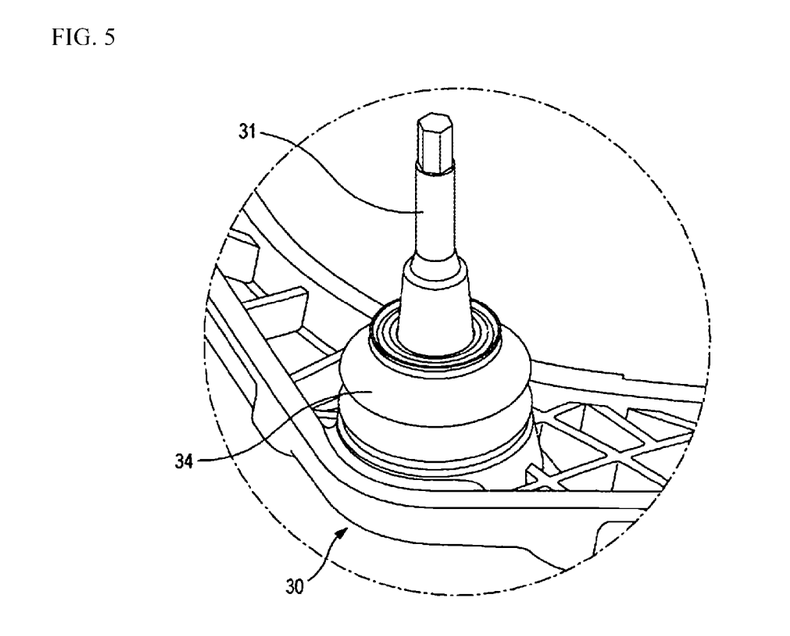
FIG. 5 is an enlarged view of an area A in FIG. 2.
Figure 6:
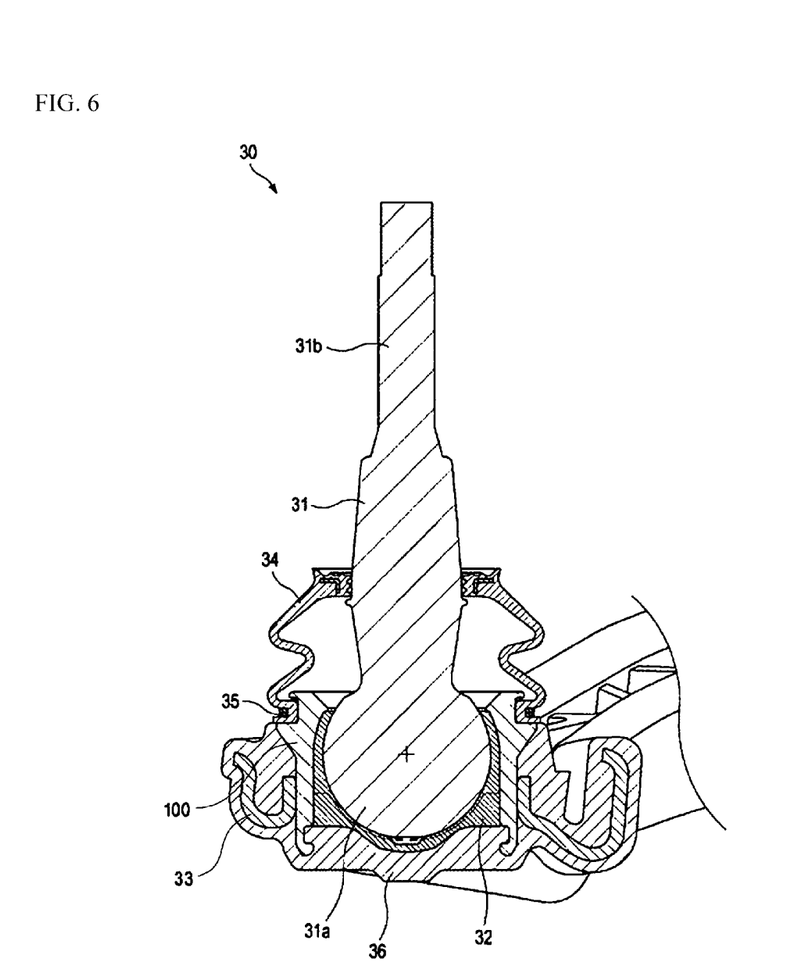
FIG. 6 is a cross-sectional view taken along line IV-IV in FIG. 2.

FIG. 5 is an enlarged view of an area A in FIG. 2. FIG. 6 is a cross-sectional view of a portion of the ball joint 30 of the vehicular suspension arm 1 according to one embodiment of the present disclosure.

The ball joint 30 may comprise the ball stud 31 including a vertically-extending rod 31b and a spherical ball 31a; the bearing 32 in which the spherical ball 31a of the ball stud 31 is accommodated and configured to rotatably support the spherical ball 31a; the housing 100 having an inner peripheral portion in which the bearing 32 is accommodated and an outer peripheral portion; the arm body 33 coupled to an outer peripheral surface of the housing 100; the dust cover 34 configured to cover a portion of the rod 31*b* of the ball stud 31 to prevent inflow of external foreign substances; a ring clip 35 for assembling the dust cover 34 to the ball stud 31; and a protector provided to cover the ball stud 31 in a direction opposite to the bearing 32.

An upper end portion of the rod 31*b* is coupled to a knuckle of the vehicle. As the vehicle travels, the rod 31*b* is configured to be pivotable relative to the bearing 32 around the ball 31*a*.

The housing 100 may have a hollow cylindrical shape. For example, the housing 100 may be manufactured by press-forming a pipe material, or may be manufactured by a forging process.

The bearing 32 may be manufactured by injection-molding an acetal-based plastic material. For example, the acetal-based plastic material may be POM (Polyacetal, Polyoxymethylene) material. Accordingly, the bearing 32 can have excellent friction resistance and abrasion resistance, and thus can maintain initial performance even if it is used for a long time. The bearing 32 may also be defined as a ball seat on which the ball 31*a* of the ball stud 31 is seated.

The cross section of the arm body 33 may be formed in a u-like shape. The arm body 33 may comprise a first extended portion 33*a* coupled to the outer peripheral portion of the housing 100, a second extended portion 33*b* extending to be bent in a radially outward direction OR from a lower end of the first extended portion 33*a*, and a third extended portion 33*c* extending to be bent upwardly in an axial direction AD from the second extended portion 33*b*. The arm body 33 may be formed of a steel material.

Figure 7:
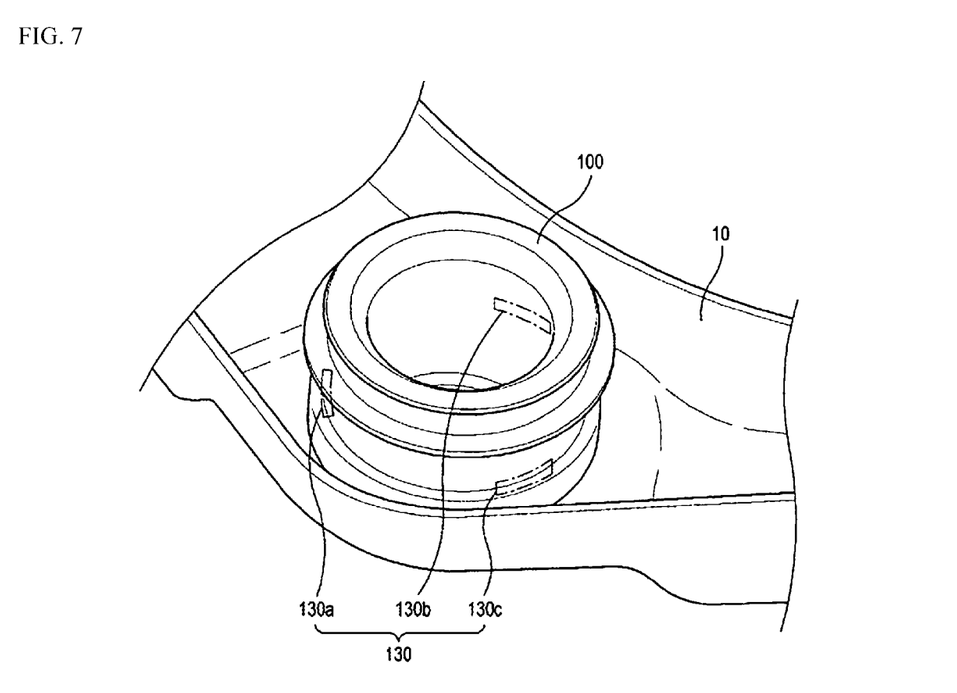
FIG. 7 is an enlarged view of a configuration in which a suspension arm body and a housing of a ball joint are not omitted from FIG. 5.

FIG. 7 is a partial rear view of a configuration in which the suspension arm body 10 and the housing 100 of the ball joint 30 are omitted from FIG. 5.

The arm body 33, not shown in FIG. 7, may be coupled to welding surface 130 formed on the outer peripheral surface of the housing 100 by welding. For example, the welding may be performed by an arc welding which supplies heat necessary for the welding through an electric arc generated between a welding rod and a welding target portion. In addition, the welding may be performed by an electric welding, a $CO_2$ welding, an oxygen welding, an argon welding, a spot welding or the like, but not limited thereto.

In another embodiment, the outer peripheral surface of the housing 100 and the arm body 33 may be coupled to each other in another method, such as a laser welding, an ultrasonic, or the like. However, the coupling method is not limited to the above-exemplified methods.

The welding surface 130, in which the arm body 33 and the housing 100 are welded, may be formed at plural locations on the outer peripheral surface of the housing 100, for example, three locations on the outer peripheral surface of the housing 100, as shown in FIG. 7. That is, a first welding surface 130*a*, a second welding surface 130*b*, and a third welding surface 130*c* may be formed on the outer peripheral surface of the housing 100.

The first welding surface 130*a*, the second welding surface 130*b*, and the third welding surface 130*c* may be arranged at regular intervals on the outer peripheral surface of the housing 100 along a circumferential direction CD. As an example, the first welding surface 130*a*, the second welding surface 130*b*, and the third welding surface 130*c* may be arranged at intervals of 120 degrees along the circumferential direction CD. Further, each of the first welding surface 130*a*, the second welding surface 130*b*, and the third welding surface 130*c* may have a length of about 10 mm to 15 mm along the circumferential direction CD.

The coupling force between the housing 100 and the arm body 33 may be further enhanced by welding. In consideration of the coupling force between the housing 100 and the arm body 33 and/or the manufacturing cost of the suspension arm body 10, the number of welding surfaces 130 may be appropriately designed.

Figure 8:
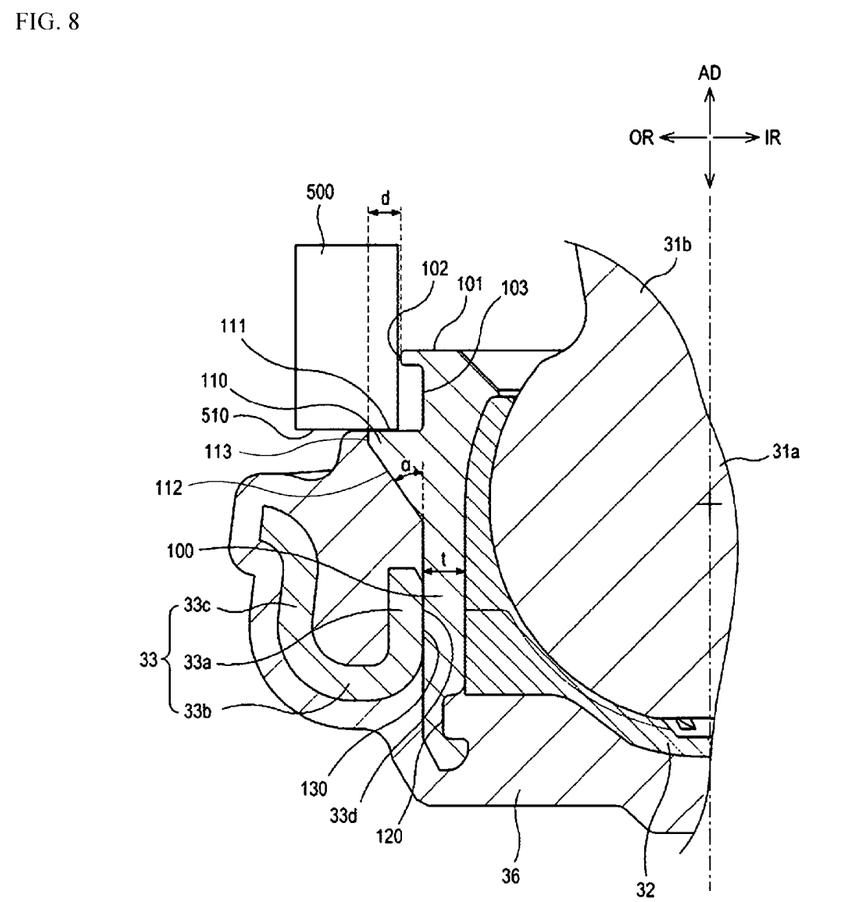
FIG. 8 is a partial cross-sectional view of a portion of the ball joint of the vehicular suspension arm according to one embodiment of the present disclosure.

FIG. 8 is a partial cross-sectional view of a portion of the ball joint 30 of the vehicular suspension arm 1 according to one embodiment of the present disclosure.

In FIG. 8, the dust cover 34 to be coupled to the upper portion of the housing 100 and the ring clip 35 for assembling the dust cover 34 to the ball stud 31 are not shown.

Referring to FIG. 8, the housing 100 may comprise a matching portion 110 having a matching surface 111 formed to protrude the radially outward direction OR from an upper portion of the outer peripheral portion of the housing 100 and to be in contact with a lower surface 510 of the mold 500. The matching surface 111 may extend in a radial direction. The matching portion 110 having the matching surface 111 may comprise an inclined surface 112 formed to be inclined in the radially outward direction OR from the lower portion of the housing 100 toward the upper portion of the housing 100.

In one embodiment, an angle α between the inclined surface 112 and a central axis of the housing 100 may be in a range of, for example, 20 degrees to 65 degrees. As an example, the angle α between the inclined surface 112 and the central axis of the housing 100 may be 35 degrees. In addition, a radially linear distance d in the radial direction between a radially leading end surface 102 of an upper end portion 101 of the housing 100 and a radially leading end surface 113 of the matching portion 110 may be in a range of, for example, 1.5 mm to 3 mm. As an example, the linear distance d in the radial direction between the radially leading end surface 102 of the upper end portion 101 of the housing 100 and the radially leading end surface 113 of the matching portion 110 may be 2.3 mm. Further, a radial thickness t of the housing 100 below the matching portion 110 may be in a range of, for example, 2 mm to 4 mm. As an example, the radial thickness t of the housing 100 below the matching portion 110 may be 3.15 mm.

A groove 120 may be formed in an inner peripheral surface of the lower end portion of the housing 100 to be concave in the radially outward direction OR along the circumferential direction CD of the inner peripheral surface. The groove 120 may be formed at the lower end portion of the housing 100 by a turning process.

A space of the groove 120 formed at the lower end portion of the housing 100 is filled with the insert molding part 36. As a result, the coupling force between the insert molding part 36 and the housing 100 in the axial direction AD can be enhanced.

In one embodiment, the groove 120 may have a depth of 1 mm to 3 mm in the radially outward direction OR from the inner peripheral surface of the housing 100 and a width of 1 mm to 3 mm in the axial direction AD. When the depth and/or the width of the groove 120 is less than 1 mm, the space of the groove 120 becomes too narrow. This makes it difficult to sufficiently secure the coupling force between the insert molding part 36 and the housing 100 in the axial direction AD. When the depth and/or the width of the groove 120 exceeds 3 mm, the mechanical strength of the housing 100 may be decreased.

A dust cover coupling portion 103 may be formed in the upper portion of the housing 100. The dust cover coupling portion 103 may be formed between the matching surface 111 and the upper end portion 101 of the housing 100. The dust cover coupling portion 103 may be formed to be concave radially inward of the housing 100. A portion of the dust cover 34 may be coupled to the dust cover coupling portion 103.

The insert molding part 36 may be coupled to the bearing 32, the housing 100, and the arm body 33 by injecting a molding material to the lower portion of the bearing 32 and the outer peripheral portion of the housing 100. The insert molding part 36 may cover the lower portion of the bearing 32 and the outer peripheral portion of the housing 100. The insert molding part 36 may be filled into the groove 120 formed in the housing 100, and may be filled into a space surrounded by the first extended portion 33a, the second extended portion 33b and the third extended portion 33c of the arm body 33.

Accordingly, the bearing 32, the housing 100, and the arm body 33 can be coupled to each another by the insert molding part 36.

Since the arm body 33 is directly coupled to the outer peripheral surface of the housing 100, the arm body 33 is supported by the coupling surface with the outer peripheral surface of the housing 100, and the force acting in the axial direction AD is not transmitted to the matching portion 110.

Further, since the matching portion 110 comprises the inclined surface 112, even in a specific case in which the welding coupling between the housing 100 and the arm body 33 are broken, the force acting in the axial direction AD is transmitted obliquely along the inclined surface 112. Thus, the housing 100 is not supported by the arm body 33 through the matching portion 110 in the axial direction AD.

In addition, through the matching portion 110, it is possible to reduce the weight of the suspension arm 1 by reducing the radial thickness of the housing 100 below the matching portion 110 while forming the matching surface 111 to be matched with the lower surface 510 of the mold 500.

In addition, since the matching portion 110 is matched with the lower surface 510 of the mold 500, the molding material may be prevented from flowing into the dust cover coupling portion 103 by the mold 500 during the injection process of the molding. This makes it possible to smoothly perform the coupling between the dust cover 34 and the dust cover coupling portion 103.

Figure 9:
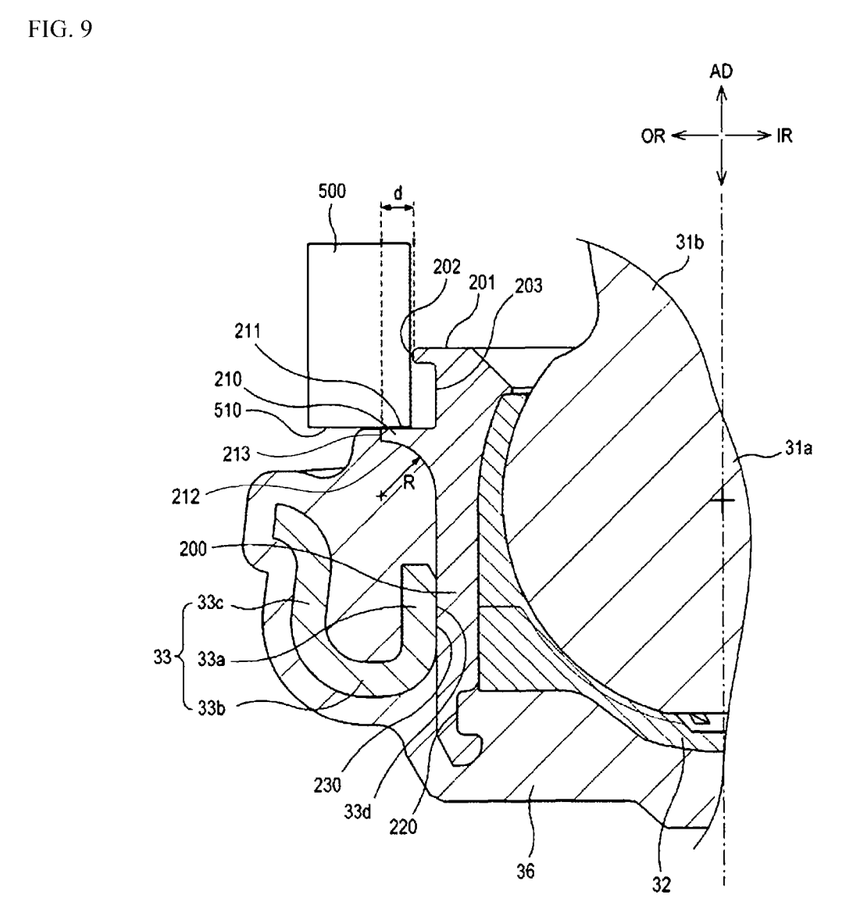
FIG. 9 is a partial cross-sectional view of a portion of the ball joint of the vehicular suspension arm according to one embodiment of the present disclosure.

FIG. 9 is a partial cross-sectional view of a portion of the ball joint 30 of the vehicular suspension arm 1 according to one embodiment of the present disclosure.

In FIG. 9, the dust cover 34 to be coupled to an upper portion of a housing 200 and the ring clip 35 for assembling the dust cover 34 to the ball stud 31 are not shown.

Referring to FIG. 9, the housing 200 may comprise a matching portion 210 formed to protrude in the radially outward direction OR from the upper portion of an outer peripheral portion of the housing 200. The matching portion 210 may comprise a curved surface 212 formed to be curved in the radially outward direction from the lower portion toward the upper portion of the housing 200. A radius R of the curved surface 212 may be in a range of, for example, 2 mm to 4 mm. Description of other configuration that overlap with the above-described embodiments will be omitted.

In the embodiment of FIG. 9, since the arm body 33 is directly coupled to the outer peripheral surface of the housing 200, the arm body 33 is supported by the coupling surface with the outer peripheral surface of the housing 200. Thus, the force acting in the axial direction is not transmitted to the matching portion 210.

Further, since the matching portion 210 comprises the curved surface 212, even in a specific case in which the welding coupling between the housing 200 and the arm body 33 are broken, the force acting in the axial direction AD is transmitted obliquely along the curved surface 212. Thus, the housing 200 is not supported by the arm body 33 through the matching portion 210 in the axial direction AD.

Figure 10:
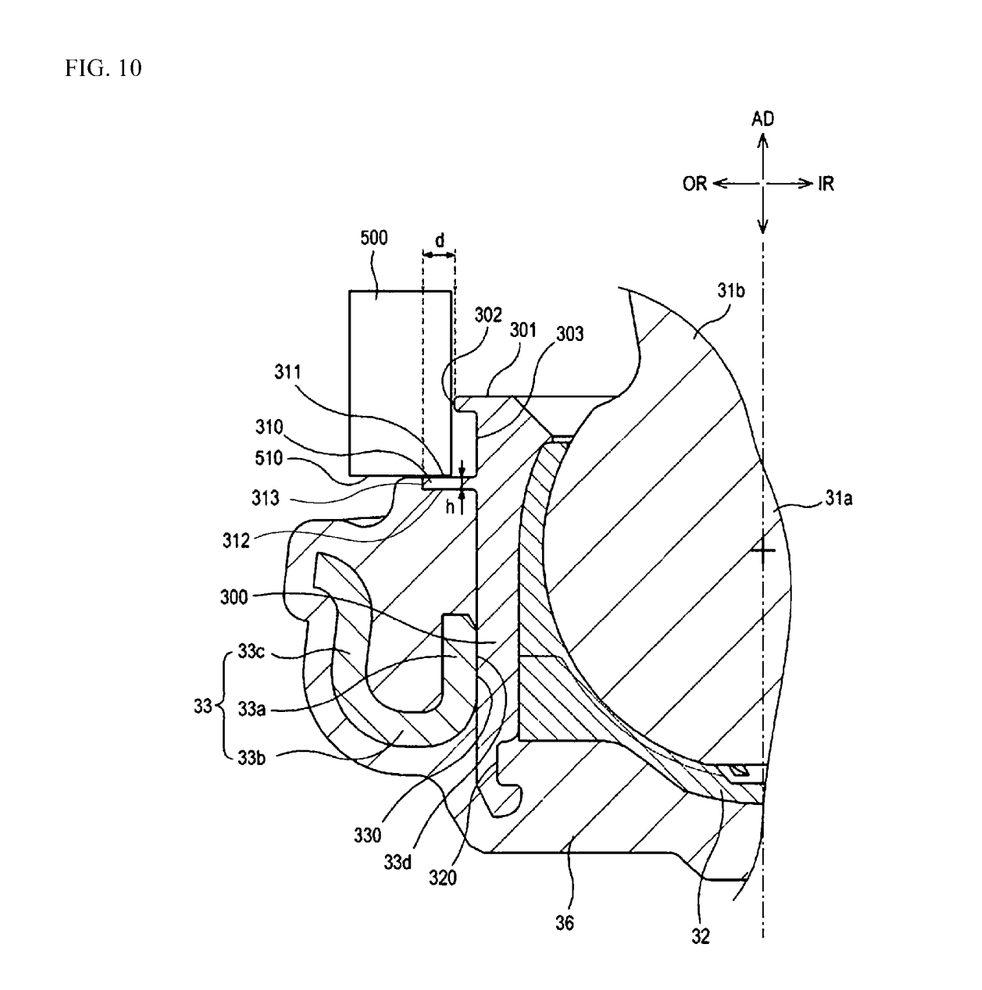
FIG. 10 is a partial cross-sectional view of a portion of the ball joint of the vehicular suspension arm according to one embodiment of the present disclosure.

FIG. 10 is a partial cross-sectional view of a portion of the ball joint 30 of the vehicular suspension arm 1 according to one embodiment of the present disclosure.

In FIG. 10, the dust cover 34 to be coupled to an upper portion of a housing 300 and the ring clip 35 for assembling the dust cover 34 to the ball stud 31 are not shown.

Referring to FIG. 10, the housing 300 may comprise a matching portion 310 formed to protrude in the radially outward direction OR from an upper portion of an outer peripheral portion of the housing 300. The matching portion 310 may comprise a matching surface 311 that is matched with the lower surface 510 of the mold 500 and a lower surface 312 that is parallel to the matching surface 311. A distance h between the matching surface 311 and the lower surface 312 may be in a range of, for example, 1 mm to 2 mm. Description of other configuration that overlap with the above-described embodiments will be omitted.

In the embodiment of FIG. 10, since the inclined surface 112 or the curved surface 212 is not formed on the lower portion of the matching portion 310, the volume of the matching portion 310 may be as small as possible, thereby minimizing the volume of the housing 300. This makes it possible to reduce the weight of the housing 300 as much as possible while forming the matching surface 311.

In addition, since the arm body 33 is directly coupled to the outer peripheral surface of the housing 300, the arm body 33 is supported by the coupling surface with the outer peripheral surface of the housing 300, and the force acting in the axial direction is not transmitted to the matching portion 310.

Figure 11:
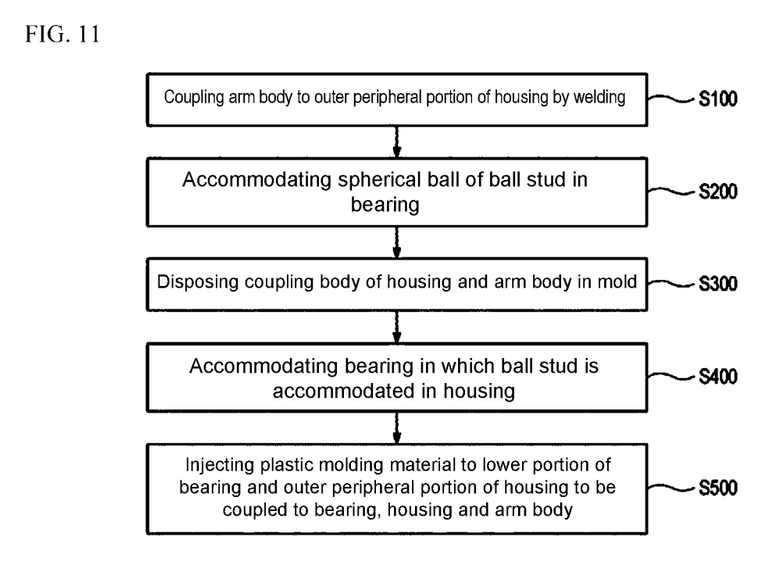
FIG. 11 is a flowchart illustrating a method of manufacturing the vehicular suspension arm according to one embodiment of the present disclosure.

FIG. 11 is a flowchart illustrating a method of manufacturing the vehicular suspension arm 1 according to one embodiment of the present disclosure.

The method of manufacturing the vehicular suspension arm 1 according to one embodiment of the present disclosure may comprise: a step (S100) of coupling the arm body 33 to the outer peripheral portion of the housing 100, 200, 300 by welding; a step (S200) of accommodating the spherical ball 31a of the ball stud 31 in the bearing 32 and rotatably fixing the spherical ball 31a in the bearing 32; a step (S300) of disposing the coupling body of the housing 100, 200, 300 and the arm body 33 in the mold 500; a step (S400) of accommodating the bearing 32 in which the ball stud 31 is accommodated in the housing 100, 200, 300; and a step (S500) of injecting a plastic molding material to the lower portion of the bearing 32 and the outer peripheral portion of the housing 100, 200, 300 such that the plastic molding material is coupled to the bearing 32, the housing 100 (200, 300) and the arm body 33.

At this time, the matching portion 110, 210, 310 may be formed on the housing 100, 200, 300 to protrude in the radially outward direction OR from the outer peripheral surface of the upper portion of the housing 100, 200, 300. In the step (S300) of disposing the coupling body of the housing 100, 200, 300 and the arm body 33 in the mold 500, the lower surface 510 of the mold 500 may be in contact with the matching surface 111, 211, 311 of the matching portion 110, 210, 310.

In addition, the arm body 33 may be manufactured by a burring process. Specifically, curved portions, which are connection portions between the first to the third extended portion 33a, 33b, 33c of the arm body 33 may be formed by the burring process.

The burring process may comprise drilling a hole in a flat steel plate; widening the hole to deform an edge of the hole in a cylindrical shape by press-punching to widen the hole; and forming the first extended portion 33a that is to be coupled to the welding surface 130, 230, 330 formed on the outer peripheral portion of the housing 100, 200, 300. At this time, the welding surfaces 130, 230, 330 and the inner peripheral surface 33d of the first extended portion 33a may be coupled to each other.

Further, in the step of coupling the arm body 33 to the outer peripheral surface of the housing 100, 200, 300 by welding, the welding may be an arc welding which supplies heat necessary for the welding through an electric arc generated between the welding rod and the welding target portion. In addition, the step of coupling the arm body 33 to the outer peripheral surface of the housing 100, 200, 300 by welding may be performed on at least one welding surface 130, 230, 330 formed in a length of 10 mm to 15 mm along the circumferential direction on the outer peripheral surface of the housing 100, 200, 300.

In the present embodiment, since the lower surface 510 of the mold 500 is in contact with the matching surface 111, 211, 311, the housing 100, 200, 300, the ball stud 31 and the like can be stably fixed in the mold 500. Further, since the lower surface 510 of the mold 500 and the matching surface 111, 211, 311 are in contact with each other, the plastic insert-molding material injected upward from the lower portion of the ball stud 31 can be prevented from flowing into a region above the matching surface 111, 211, 311 and the mold 500. Thus, it is possible to prevent the insert molding part 36 from being formed in the region above the matching surface 111, 211, 311. In addition, when the matching surface 111, 211, 311 of the matching portion 110, 210, 310 and the lower surface 510 of the mold 500 are matched with each other, the molding material can be prevented from flowing into the dust cover coupling portion 103, 203, 303 during the injection process of the molding. In addition, by decreasing the radial thickness t of the housing 100, 200, 300 except for the matching portion 110 (210, 310), it is possible to reduce the weight of the suspension arm 1.

Although the technical spirit of the present disclosure has been described using some embodiments and examples shown in the accompanying drawings, it should be noted that various substitutions, modification, and variations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A suspension arm comprising:
a ball stud including a spherical ball;
a bearing in which the spherical ball is accommodated;
a housing having an inner peripheral portion and an outer peripheral portion, the bearing being accommodated in the inner peripheral portion;
an arm body coupled to the outer peripheral portion of the housing; and
an insert molding part which is injected to a lower portion of the bearing and the outer peripheral portion of the housing to be coupled to the bearing, the housing, and the arm body,
wherein the housing comprises a matching portion formed to protrude in a radially outward direction from an upper portion of the outer peripheral portion,
an upper portion of the matching portion includes a matching surface formed to be perpendicular to an axial direction and configured to be brought into contact with a mold, and
a top surface of the insert molding part is in line with the matching surface.

2. The suspension arm of claim 1, wherein the matching portion comprises an inclined surface formed to be inclined in the radially outward direction from a lower portion of the housing toward the upper portion of the housing.

3. The suspension arm of claim 2, wherein an angle between the inclined surface and a central axis of the housing is in a range of 20 degrees to 65 degrees.

4. The suspension arm of claim 1, wherein the matching portion comprises a curved surface formed to be curved in the radially outward direction from a lower portion of the housing toward the upper portion of the housing.

5. The suspension arm of claim 1, wherein the matching portion comprises a lower surface parallel to the matching surface.

6. The suspension arm of claim 1, wherein a linear distance in a radial direction between a radially leading end surface of an upper end portion of the housing and a radially leading end surface of the matching portion is in a range of 1.5 mm to 4 mm.

7. The suspension arm of claim 1, wherein an outer peripheral surface of the housing comprises at least one welding surface that is welded to an inner peripheral surface of the arm body.

8. The suspension arm of claim 7, wherein the at least one welding surface has a plurality of welding surfaces distributed at regular intervals along the outer peripheral surface of the housing.

9. The suspension arm of claim 7, wherein the matching portion and the arm body are arranged to be spaced apart from each other in the axial direction, and an axial force is not applied between the matching portion and the arm body by the coupling of the housing and the arm body via welding.

10. The suspension arm of claim 7, wherein the welding between the at least one welding surface and the inner peripheral surface is achieved via arc welding which supplies heat necessary for the welding through an electric arc generated between a welding rod and a welding target portion.

11. The suspension arm of claim 1, wherein a radial thickness of the housing below the matching portion is in a range of 2 mm to 4 mm.

12. The suspension arm of claim 1, wherein an inner peripheral surface of a lower end portion of the housing has a groove formed to be concave in the radially outward direction along a circumferential direction of the inner peripheral surface.

13. A ball joint, comprising:
a ball stud including a spherical ball;
a bearing in which the spherical ball is accommodated;
a housing having an inner peripheral portion and an outer peripheral portion, a bearing being accommodated in the inner peripheral portion; and
an insert molding part which is injected to a lower portion of the bearing and the outer peripheral portion of the housing, wherein the housing comprises a matching portion formed to protrude in a radially outward direction from an upper portion of the outer peripheral portion, an upper portion of the matching portion includes a matching surface formed to be perpendicular to an axial direction and configured to be brought into contact with a mold, and a top surface of the insert molding part is in line with the matching surface.

\* \* \* \* \*